US008009930B2

(12) United States Patent
Li et al.

(10) Patent No.: US 8,009,930 B2
(45) Date of Patent: Aug. 30, 2011

(54) AUTO-CALIBRATION METHOD FOR A PROJECTOR-CAMERA SYSTEM

(75) Inventors: Youfu Li, New Territories (HK); Beiwei Zhang, Nanjing (CN)

(73) Assignee: City University of Hong Kong, Kowloon (HK)

( * ) Notice: Subject to any disclaimer, the term of this patent is extended or adjusted under 35 U.S.C. 154(b) by 826 days.

(21) Appl. No.: 12/079,382

(22) Filed: Mar. 26, 2008

(65) Prior Publication Data

US 2009/0245690 A1    Oct. 1, 2009

(51) Int. Cl.
*G06K 9/36* (2006.01)

(52) U.S. Cl. ........ 382/289; 382/293; 382/295; 382/296; 345/649; 345/656; 345/657; 345/659; 345/672; 345/682; 359/470

(58) Field of Classification Search .................. 382/289, 382/293, 295, 296; 345/549, 656, 657, 659, 345/672, 682; 359/470
See application file for complete search history.

(56) References Cited

U.S. PATENT DOCUMENTS

| 6,671,386 | B1 * | 12/2003 | Shimizu et al. | 382/100 |
| 7,133,570 | B1 * | 11/2006 | Schreier et al. | 382/278 |
| 2003/0202691 | A1 * | 10/2003 | Beardsley | 382/154 |

OTHER PUBLICATIONS

B. Zhang and Y. F. Li, Dynamic Recalibration of an Active Vision System via Generic Homography, IEEE 2005.*
Toshio Ueshiba, Fumiaki Tomita, Plane-based Calibration Algorithm for Multi-camera Systems via Factorization of Homography Matrices, IEEE 2003.*
Zhengyou Zhang, A Flexible New Technique for Camera Calibration, IEEE 2000.*
Yongduek Seo and Ki Sang Hong, Calibration-Free Augmented Reality in Perspective, IEEE 2000.*
Selim Benhimane, Ezio Malis, Homography-based 2D Visual Servoing, IEEE 2006.*
R. Tsai, T. Huang, "Estimating three-dimensional motion parameters of a rigid planar patch," *IEEE Trans. Acoust. Speech and Signal Process*, vol. ASSP-29, pp. 525-534, 1981.
R. Tsai, T. Huang, and W. Zhu, "Estimating three dimensional motion parameters of a rigid planar patch, II: singular value decomposition," *IEEE Trans. Acoust. Speech and Signal Process*, vol. ASSP-30, pp. 525-534, 1982.
S. Y. Chen, and Y. F. Li, "Self-recalibration of a color-encoded light system for automated three-dimensional measurements," *Measurement Science and Technology*, vol. 14, No. 1, pp. 33-40, Jan. 2003.
Z. Zhang, and A. R. Hanson, "Scaled Euclidean 3D reconstruction based on externally uncalibrated cameras," *IEEE International Symposium on Computer Vision*, Coral Gables, Florida, Nov. 1995, pp. 37-42.
G. Schweighofer and A. Pinz, "Robust Pose Estimation from a Planar Target," *IEEE Trans. on Pattern Analysis and Machine Intelligence*, vol. 28, No. 12, Dec. 2006, pp. 2024-2030.

(Continued)

*Primary Examiner* — Wesley Tucker
*Assistant Examiner* — Marz Roz
(74) *Attorney, Agent, or Firm* — Heslin Rothenberg Farley & Mesiti P.C.

(57) ABSTRACT

A method for self-recalibration of a structured light vision system including a camera and a projector. A camera plane and a projector plane are defined, a Homography matrix between the camera plane and the projector plane is computed, and a translation vector and a rotation matrix are determined from Homography-based constraints. A computer vision system implementing the method is also described.

8 Claims, 13 Drawing Sheets
(4 of 13 Drawing Sheet(s) Filed in Color)

OTHER PUBLICATIONS

Lu et al, "Fast and globally convergent pose estimation from video images," *IEEE Trans. on Pattern Analysis and Machine Intelligence*, vol. 22, No. 6, 200, pp. 610-622.

D.Fofi, J. Salvi, and E. Mouaddib, "Uncalibrated reconstruction: an adaptation to structured light vision," *Pattern Recognition*, vol. 36, No. , Jul. 2003, pp. 1631-1644.

H.C. Longuet-Higgins, "The visual ambiguity of a moving plane," *Proceedings of the Royal Society of London Series B*, vol. 223, No. 1231, pp. 165-175, 1984.

J. C Hay, "Optical motion and space perception; an extension of Gibson's analysis," *Psychological Review*, vol. 73, No. 6, pp. 550-565, 1966.

Z. Zhang, and A. R. Hanson, "Scaled Euclidean 3D reconstruction based on externally uncalibrated cameras," *IEEE International Symposium on Computer Vision*, Coral Gables, Florida, Nov. 1995, pp. 37-42.

H.C. Longuet-Higgins, "The reconstruction of a plane surface from two perspective projections," *Proceedings of the Royal Society of London Series B*, vol. 227, No. 1249, pp. 399-410, 1986.

* cited by examiner

AUTO-CALIBRATION METHOD FOR A PROJECTOR-CAMERA SYSTEM

FIELD OF INVENTION

This invention relates to a method for the automatic calibration of a vision system such as a projector and a camera, and in particular to a method for the self-calibration of a structured light system via plane-based homography. The invention also relates to a computer vision system that uses such a method.

BACKGROUND OF THE INVENTION

Camera calibration and 3D reconstruction have been studied for many years but is still an active research topic that arises in the fields of object modeling, mobile robot navigation and localization, and environment building amongst others. In all these applications there is a need to obtain 3D information of an object or scene from a 2D camera image.

In general, the problem of camera calibration and 3D reconstruction can be approached in three different ways. When both the intrinsic and extrinsic parameters of a vision system are known, the 3D reconstruction can easily be obtained by traditional triangulation methods. When the parameters of the vision system are totally uncalibrated, the 3D structure can be reconstructed up to a projective transformation from two uncalibrated images.

More usual than either of these extreme positions is the situation where the vision system may be assumed to have some of its intrinsic and extrinsic parameters calibrated while others are unknown. This may be referred to as a semi-calibrated vision system. Usually the intrinsic parameters are assumed to be known while the external parameters need to be calibrated.

It has been noted that in semi-calibrated vision systems the relative pose problem can also be solved from the correspondences between images of a scene plane. However, the computation efficiency for the pose problem is of critical importance particularly in robotic applications where planar surfaces are encountered frequently in a number of robotic tasks such as the navigation of a mobile robot along a ground plane, and the navigation of a wall climbing robot for the cleaning, inspection and maintenance of buildings. Traditional calibration methods such as the eight-point algorithm and the five-point algorithm will fail or give poor performance in planar or near planar environments since they require a pair of images from the three-dimensional scene.

Methods using only planar information have been explored. Hay (J. C Hay, "Optical motion and space perception; an extension of Gibson's analysis," *Psychological Review*, Vol. 73, No. 6, pp. 550-565, 1966) was the first to report the observation that two planar surfaces undergoing different motions could give rise to the same image motion. Tsai et al. (R. Tsai, T Huang, "Estimating three-dimensional motion parameters of a rigid planar patch," *IEEE Trans. Acoust. Speech and Signal Process*, Vol. ASSP-29, pp .525-534, 1981) used the correspondence of at least four image points to determine the two interpretations of planar surfaces undergoing large motions. Tsai et al. (R. Tsai, T Huang, and W. Zhu, "Estimating three dimensional motion parameters of a rigid planar patch, II: singular value decomposition," *IEEE Trans. Acoust. Speech and Signal Process*, Vol. ASSP-30, pp. 525-534, 1982) later approached the same problem by computing the singular value decomposition of a 3×3 matrix containing eight "pure parameters." Longuet-Higgins (H. C. Longuet-Higgins, "The visual ambiguity of a moving plane," *Proceedings of the Royal Society of London Series B*, Vol. 223, No. 1231, pp. 165-175, 1984 and HC. Longuet-Higgins, "The reconstruction of a plane surface from two perspective projections," *Proceedings of the Royal Society of London Series B*, Vol. 227, No. 1249, pp. 399-410, 1986) showed that three dimensional interpretations could be obtained by diagonalizing the 3×3 matrix, where the relative pose of the system and the normal vector of the planar surface could be achieved simultaneously by a second-order polynomial. Zhang et al (Z. Zhang, and A. R. Hanson, "Scaled Euclidean 3D reconstruction based on externally uncalibrated cameras," *IEEE International Symposium on Computer Vision*, Coral Gables, Fla., November 1995, pp. 37-42) proposed a method for this problem from a case by case analysis of different geometric situations where as many as six cases were considered. Recently, Chen et al (*S. Y Chen, and Y F Li*, "Self-recalibration of a color-encoded light system for automated three-dimensional measurements," *Measurement Science and Technology*, Vol. 14, No. 1, pp. 33-40, January 2003) also proposed a method for recalibrating a structured light system by using planar information and using a fundamental matrix with a minimum number of six points. In general, the prior art either requires the solution of high order equations or needs to consider many possible cases.

SUMMARY OF THE INVENTION

According to the present invention there is provided a method for self-recalibration of a structured light vision system comprising a camera and a projector. The method comprises defining a camera plane and a projector plane, computing a Homography matrix between the camera plane and the projector plane, and determining a translation vector and a rotation matrix from Homography-based constraints.

Preferably prior to determining the translation vector, if the intrinsic parameters of the camera are known a scale factor and its sign are determined. If the focal length of the camera is varying the focal lengths are first computed and then the scale factor is determined.

In preferred embodiments of the invention the Homography matrix is derived from at least four pairs of corresponding projection points of the scene where each pair comprises a point in the projector plane and its corresponding point in the camera plane.

To improve the quality of the results still further, bundle adjustment may be used.

According to another aspect of the invention there is provided a computer vision system. The system comprises a projector for projecting a light pattern onto an object in a scene, a camera for obtaining an image of said object, and a computer for controlling the vision system, wherein the computer implements a self-recalibration method. Further, the self-recalibration method comprises defining a camera plane and a projector plane, computing a Homography matrix between the camera plane and the projector plane, and determining a translation vector and a rotation matrix from Homography-based constraints.

These, and other objects, features and advantages of this invention will become apparent from the following detailed description of the various aspects of the invention taken in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention will now be described by way of example and with reference to the accompanying drawings, in which.

DETAILED DESCRIPTION OF INVENTION

Figure 1:
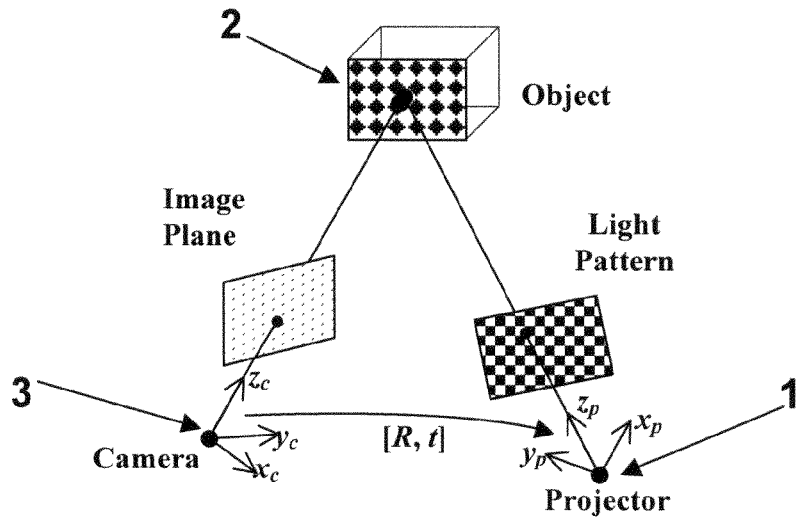
FIG. 1 is a view illustrating the geometrical relationships in a structured vision system.

FIG. 1 shows the geometrical relationships in a structured vision system comprising a projector 1, an object 2 and a camera 3. The projector 1 is controlled by a computer and projects a light pattern onto the object. The surface of the object 2 will distort the light pattern and these distortions are captured by the camera 3 and used for calibration of the system and then reconstruction of the scene.

For the camera and projector a right-handed coordinate system is defined with the origin of the coordinate system being at the optical centers of the camera and projector respectively. Let R and t be the rotation matrix and translation vector from the camera to the projector, and the world coordinate system coincides with the camera coordinate system. The projector may be regarded as a pseudo camera and the camera is of a pinhole type. With these conditions the intrinsic parameters of the projector and camera can be given by the following matrices:

$$K_p = \begin{bmatrix} f'_u & s' & u'_0 \\ 0 & f'_v & v'_0 \\ 0 & 0 & 1 \end{bmatrix} \quad (1)$$

$$K_c = \begin{bmatrix} f_u & s & u_0 \\ 0 & f_v & v_0 \\ 0 & 0 & 1 \end{bmatrix} \quad (2)$$

Where $f_u$, and $f_v$, represent the focal length of the camera in pixels along the u-axis and the v-axis respectively, $(u_0\ v_0)^T$ is the principal point, s is a skew factor of the camera representing the cosine value of the angle subtended between the u- and v-axes. Similar notations may be defined for the projector.

For an arbitrary 3D point $M=[X\ Y\ Z]^T$, its image in the camera and the projector can be expressed as $$m_c = \alpha K_c M \quad (3)$$

$$m_p = \beta K_p (RM+t) \quad (4)$$

Where $m_c=[u\ v\ 1]^T$ and $m_p=[u'\ v'\ 1]^T$ are the projection points on the image plane and the projector plane, and $\alpha$ and $\beta$ are nonzero scale factors.

Let $K_p R = \begin{bmatrix} k_1 \\ k_2 \\ k_3 \end{bmatrix}$ and $K_p t = \begin{bmatrix} k_1 \\ k_2 \\ k_3 \end{bmatrix}.$ Then from (3) and (4), we have four equations on the coordinates of point M $$AM = a \quad (5)$$

where $$A = \begin{bmatrix} u'k_3 - k_1 \\ v'k_3 - k_2 \\ f_u & s & u_0 - u \\ 0 & f_v & v_0 - v \end{bmatrix}$$

and $$a = \begin{bmatrix} k_1 - k_3 u' \\ k_2 - k_3 v' \\ 0 \\ 0 \end{bmatrix}.$$

According to (5), the 3D world point on the object surface can be determined by $$M = (A^T A)^{-1} A^T a \quad (6)$$

This equation describes the basic principle for 3D reconstruction using a triangulation method. Once the intrinsic and extrinsic parameters of the camera and the projector are obtained, we can compute the 3D coordinates by (5) and (6) above. It should be understood that the calibration of the structured light system consists of two parts. The first part is the calibration of the intrinsic parameters of the optical system such as focal lengths and optical centers of the camera and projector. This is a static calibration that needs to be performed only once. The second part of the calibration is the calibration of external parameters of the relative pose in which there are 6 unknown parameters, three for the 3-axis rotation and three for the three-dimensional translation. The determination of the relative pose between the camera and the projector using plane-based homography is an important aspect of the present invention. In the following, the plane-based homography computation is explained.

Assume there is a plane $\pi$ in the scene whose images in the camera and projector are $I_c$ and $I_p$ respectively. Let M be an arbitrary point on the plane. Its corresponding projections between the image plane and the projector plane are $m_c$ and $m_p$. According to projective geometry there is a 3×3 transformation matrix H between $I_c$ and $I_p$ satisfying $$m_p = \sigma H m_c \quad (7)$$

where $\sigma$ is a nonzero scale factor.

In general the matrix H is called the plane-based homography matrix.

Let $H = \begin{bmatrix} h_1 & h_2 & h_3 \\ h_4 & h_5 & h_6 \\ h_7 & h_8 & 1 \end{bmatrix}$, and $h = (h_1, h_2, h_3, h_4, h_5, h_6, h_7, h_8)^T$.

From (7), each pair of corresponding points gives two constraints on the homography, $$(u, v, 1, 0, 0, 0, -u'u, -u'v)h = u' \quad (8)$$

$$(0, 0, 0, u, v, 1, -v'u, -v'v)h = v' \quad (9)$$

and given $n(n \geq 4)$ pairs of corresponding image points of the scene, the following 2n equations can be derived:

$$Bh = b \quad (10)$$

where:

$B = \begin{bmatrix} u_1 & v_1 & 1 & 0 & 0 & 0 & -u'_1 u_1 & -u'_1 v_1 \\ 0 & 0 & 0 & u_1 & v_1 & 1 & -v'_1 x_1 & -v'_1 v_1 \\ \vdots & \vdots & \vdots & \vdots & \vdots & \vdots & \vdots & \vdots \\ u_n & u_n & 1 & 0 & 0 & 0 & -u'_n u_n & -u'_n v_n \\ 0 & 0 & 0 & u_n & v_n & 1 & -v'_n u_n & -v'_n v_n \end{bmatrix}$ and $b = (u'_1 \; v'_1 \; \ldots \; u'_n \; v'_n)^T$.

Then the homography can be determined up to a scale factor in a least squares sense according to $$h = (B^T B)^{-1} B^T b \quad (11)$$

Assuming that the equation of the plane $\pi$ is $n^T M = 1$ where $n^T$ is the normal vector of the plane, then from (4)

$$m_p = \beta K_p (R + tn^T) M \quad (12)$$

Combining (3) and (12) produces $$m_p = \frac{\beta}{\alpha} K_p (R + tn^T) K_c^{-1} m_c \quad (13)$$

By (7) and (13) the explicit formula for the homography is $$\lambda H = K_p (R + tn^T) K_c^{-1} \quad (14)$$

Where $\lambda$ is a scalar. The equivalent form of (14) is $$\lambda \overline{H} = \lambda K_p^{-1} H K_c = R + tn^T \quad (15)$$

where $\overline{H}$ is the calibrated Homography. Since H, $K_p$ and $K_c$ are known, $\overline{H}$ is known.

If the translation is $t = [t_1 \; t_2 \; t_3]^T$ then its skew symmetric matrix is $$[t]_x = \begin{bmatrix} 0 & -t_3 & t_2 \\ t_3 & 0 & -t_1 \\ -t_2 & t_1 & 0 \end{bmatrix} \quad (16)$$

This matrix $[t]_x$ has a number of useful properties. For example, $[t]_x t = 0$ and $[t]_x^T = -[t]_x$. hence, multiplying both sides of (15) by this matrix the following is obtained:

$$\lambda [t]_x \overline{H} = [t]_x R \quad (17)$$

The right-hand side of this equation is known as the Essential matrix and this equation therefore reveals the relationship between the calibrated homography and the Essential matrix. As R is a rotation matrix $RR^T = I$. From (17) we have $$\lambda^2 [t]_x \overline{HH}^T [t]_x = [t]_x [t]_x \quad (18)$$

Rearranging this gives $$[t]_x W [t]_x = 0 \quad (19)$$

Where $W = \lambda^2 \overline{HH}^T - I$ is symmetric and $\lambda$ is an unknown scalar.

To determine the scale factor $\lambda$ use can be made of two propositions the details of which are set out in the Annex to this specification. In particular, since W is symmetric, according to proposition 1, we have $$det(W) = det(\lambda^2 \overline{HH}^T - I) = 0 \quad (20)$$

Which indicates that $\lambda^2$ is the inverse of one eigenvalue of the matrix $\overline{HH}^T$. However, since there are three eigenvalues for this matrix consideration has to be given over which is the correct one and this can be done by consideration of proposition 2.

From (15) we have $$\lambda^2 \overline{HH}^T = (R + tn^T) * (R + tn^T) \quad (21)$$

Which can be equivalently changed into $$\lambda^2 \overline{HH}^T = I + Rtn^T + tn^T R^T + n^T n tt^T \quad (22)$$
$$= I \left( Rn + \frac{n^T n}{2} t \right) t^T + t \left( n^T R^T + \frac{n^T n}{2} t^T \right)$$
$$= I + st^T + ts^T$$

where $s = Rn + \frac{n^T n}{2} t$. $\quad (24)$

Because the camera and the projector both lie on the same side of the scene plane and are located at different positions, both t and s are non-zero. Thus, according to proposition 2 of the Annex $\lambda^2 \overline{HH}^T$ or $I + st^T + ts^T$, will have one eigenvalue as 1, which lies between the other two different eigenvalues or which is the eigenvalue with multiplicity two. Since the eigenvalues of $\overline{HH}^T$ are $1/\lambda^2$ times those of $\lambda^2 \overline{HH}^T$ we have the following conclusions:

(a) if the three eigenvalues are distinct from each other, $1/\lambda^2$ is the eigenvalue of $\overline{HH}^T$ that lies between the other two eigenvalues of $\overline{HH}^T$;

(b) if one of the eigenvalues of $\overline{HH}^T$ is multiplicity two, then this eigenvalue is $1/\lambda^2$.

From these conclusions the scale factor $\lambda$ can be determined. After determining this scale factor, there are then six homogenous constraints on the translation vector. If it is assumed that $t_3=1$ the constraints on the translation vector are as follows:

$$\begin{cases} w_{33}t_1^2 - w_{13}t_1 + w_{11} = 0 \\ w_{33}t_2^2 - w_{23}t_2 + w_{22} = 0 \\ w_{33}t_1t_2 - w_{23}t_1 - w_{13}t_2 + w_{12} = 0 \\ w_{13}t_2^2 - w_{23}t_1t_2 + w_{22}t_1 - w_{12}t_2 = 0 \\ w_{23}t_1^2 - w_{13}t_1t_2 - w_{12}t_1 + w_{11}t_2 = 0 \\ w_{22}t_1^2 + w_{11}t_2^2 - 2w_{12}t_1t_2 = 0 \end{cases} \quad (23)$$

Where $w_{ij}$ denotes the ij-th element of the matrix W. It can be seen that $t_1$, and $t_2$ can be obtained from the first two equations in (23) while satisfying the last four equations gives two general solutions. In the case of noise data, these six equations can be used for optimization purposes.

Since $\lambda$, t and H can all be determined as explained above, the left side of (17) is known. Therefore according to the first and second columns of both sides of (17) we have $$\begin{cases} r_{21} - t_2 r_{31} = c_{11} \\ -r_{11} + t_1 r_{31} = c_{21} \\ t_2 r_{11} - t_1 r_{21} = c_{31} \\ r_{11}^2 + r_{21}^2 + r_{31}^2 = 1 \end{cases} \quad (24)$$

and $$\begin{cases} r_{22} - t_2 r_{32} = c_{12} \\ -r_{12} + t_1 r_{32} = c_{22} \\ t_2 r_{12} - t_1 r_{22} = c_{32} \\ r_{12}^2 + r_{22}^2 + r_{32}^2 = 1 \end{cases} \quad (25)$$

where $r_{ij}$ and $c_{ij}$ denote the ij-th elements of the matrices R and C respectively. From (24) and (25) the first and second column vectors of R can be determined analytically, and the third column vector of R is then given by the cross product of these two columns.

From the above it can be seen how in embodiments of the invention a structured light system can be recalibrated following a change in the configuration system assuming that the intrinsic parameters of the camera and the projector have been previously calibrated in a static calibration stage. In particular, this may be done by (1) computing the homography matrix between the camera plane and the projector plane, (2) establishing the constraints on the translation vector and the calibrated homography matrix and determining the scale factor, (3) calculating the translation vector, and (4) calculating the rotation matrix. The results can also preferably be improved by bundle adjustment after having obtained the relative pose.

Practical applications of the above described method can be tested using both numerical simulations and real image data. Numerical simulations can be used in particular to demonstrate the issues of ambiguity of the solutions, and the robustness of the self-calibration.

With regard to the ambiguity of the solutions, Tsai and Longuet-Higgins showed how two possible interpretations of the camera motion could be determined in a closed form from the correspondences in two images of a planar surface. Negahdaripour determined the relationship between the two solutions in a closed form. In addition the derivation showed the explicit relationship between the ambiguity associated with planar scenes and that associated with curved surfaces. Knowledge of the explicit relationship between the two interpretations permits the calculation of one solution directly from the other. The following simulations will show that the results obtained from embodiments of the present invention coincide with the prior art simulations.

In the following it is assumed that the intrinsic parameters of both the camera and the projector have been calibrated in a static calibration stage. For each repeated experiment in the simulations, the translation vector and three rotation angles of the rotation matrix are selected randomly in order to cover all cases in practice. In these simulations, 10,000 random simulations were performed to reveal the ambiguity of the solutions. It should be noted that multiple solutions would be obtained by simply solving the given equations and discarding complex solutions. In order to determine which choice corresponds to the true configuration the cheirality constraint (that the scene points should be in front of the camera and projector) is imposed. Table 1 below shows the distribution of solutions after imposing the cheirality constraint.

TABLE 1

| | Number of Solutions | | | |
|---|---|---|---|---|
| | 1 | 2 | 3 | 4 |
| Frequency | 5305 | 4260 | 143 | 279 |

Figure 2:
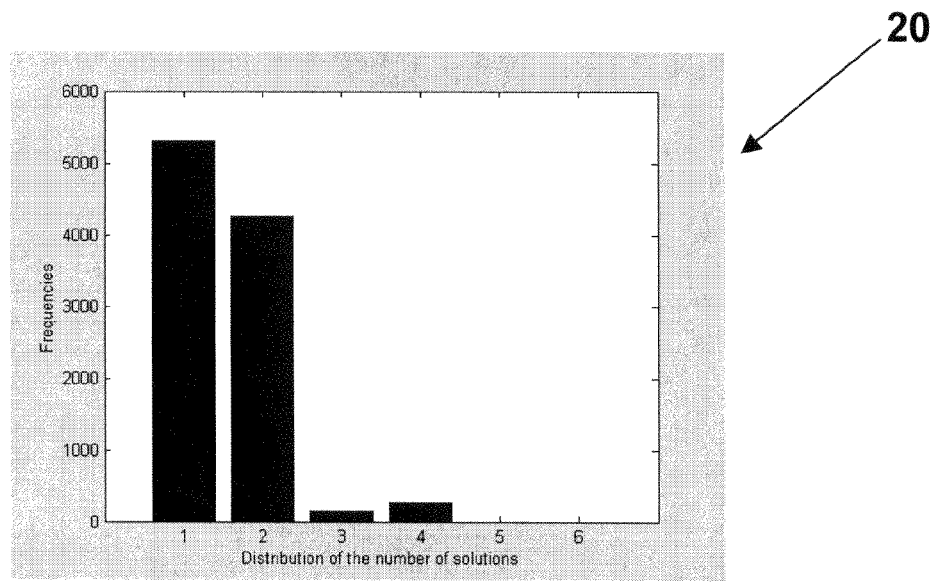
FIG. 2 is a graph showing distribution of the number of solutions in simulated results according to an embodiment of the invention.

FIG. 2 shows the graph 20 of this distribution. From this data it can be seen that there are only 1 or 2 solutions in most cases (95.65% of the time in these simulations) and the correct solution can be readily identified from further observations, and the other solution corresponds to the reflection of the correct configuration. These experimental results coincide with the conclusions of the prior art.

Figure 3:
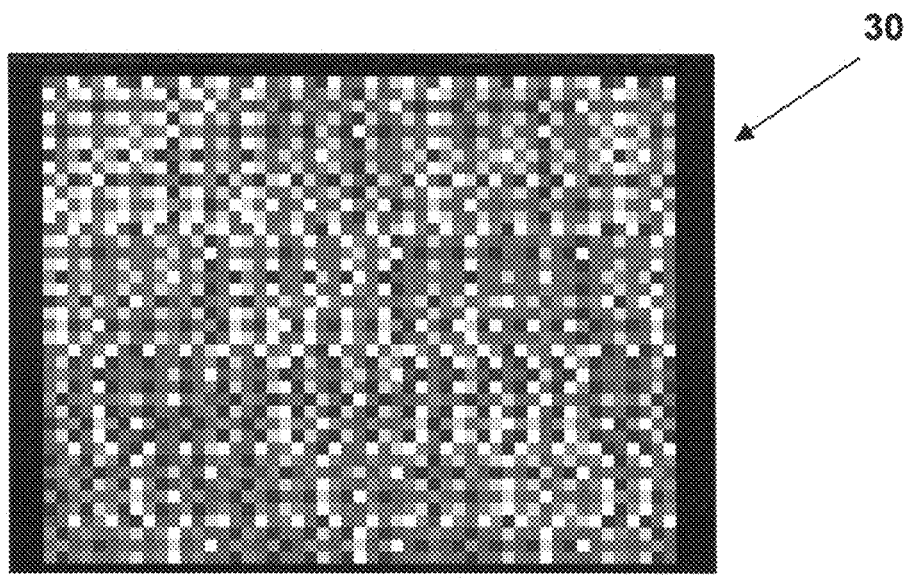
FIG. 3 illustrates (in monochrome) an example of a colored light pattern that may be projected onto a scene in an embodiment of the invention.
Figure 4A:
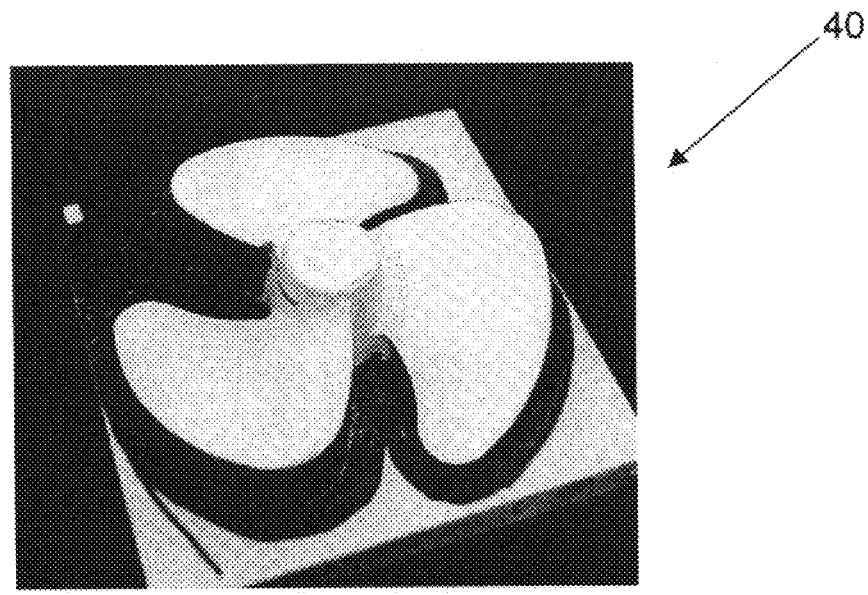
FIGS. 4(a)-(d) show respectively (a) a fan, (b) an image of the fan with a superimposed light pattern, (c) polygonized results of reconstructed point clouds, and (d) a CAD model of the reconstructed result.
Figure 4B:
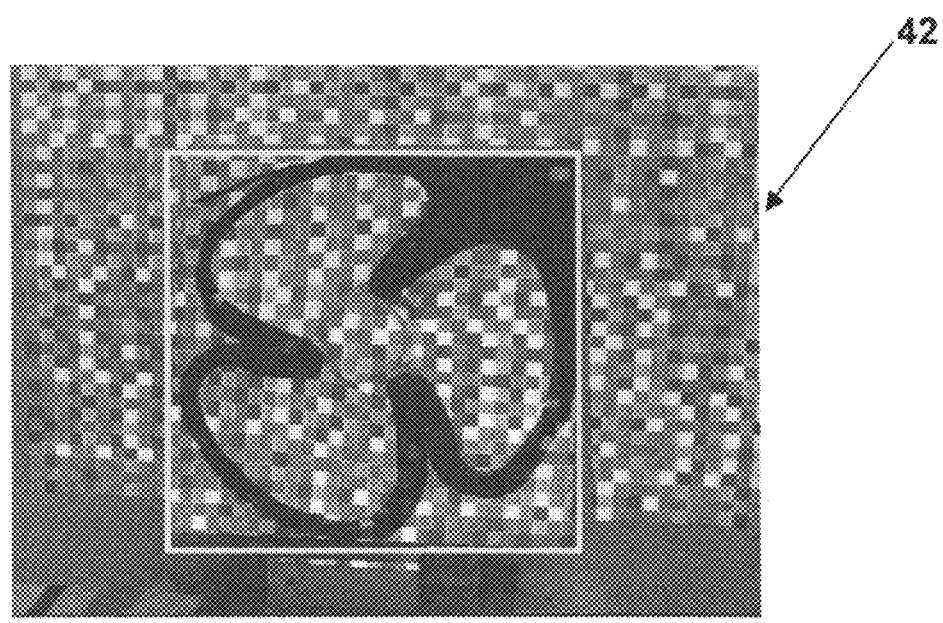
Figure 4C:
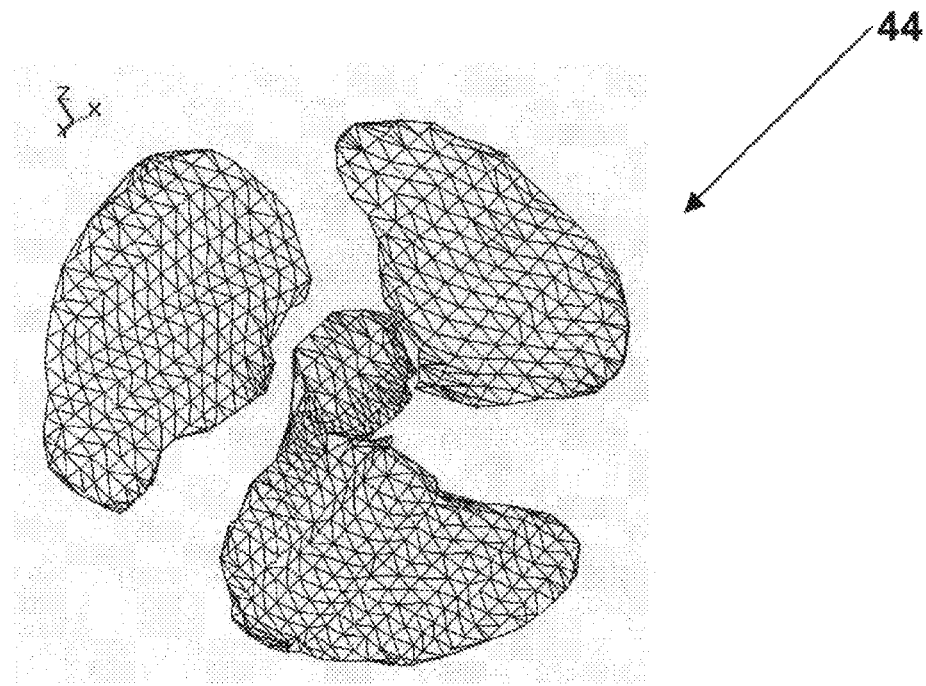
Figure 4D:
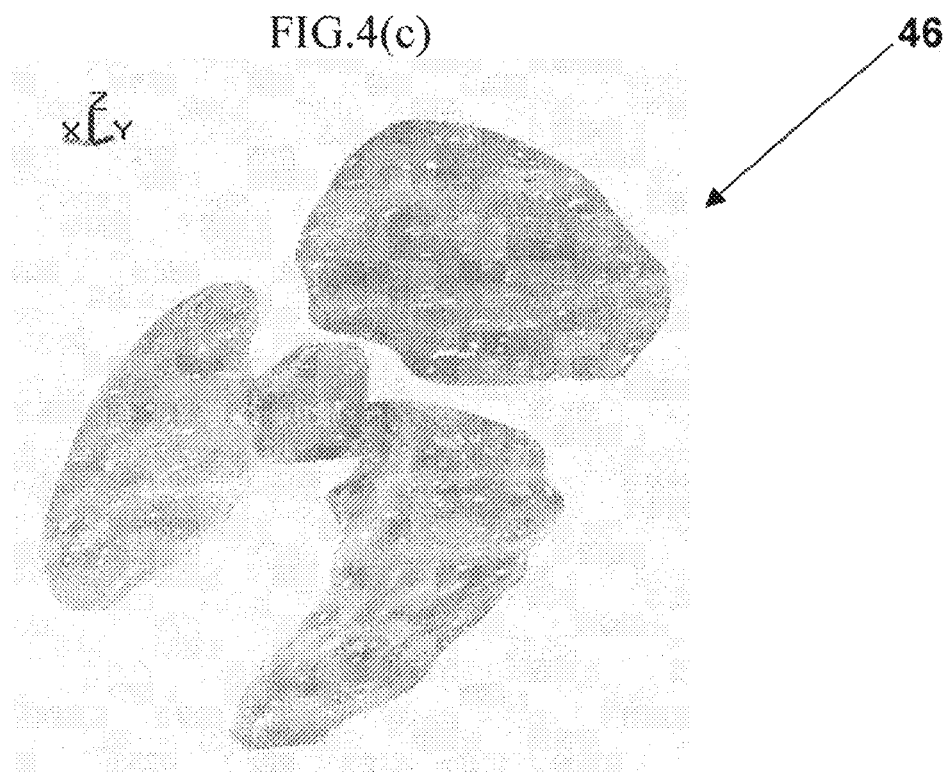

Experiments can be performed with real data to show the effectiveness of embodiments of the present invention. In the real data experiments a PULNIX TMC-9700 CCD camera and a PLUS V131 DLP projector, the relative pose between which could be changed freely, were used. A computer was used to control the projector to generate an illumination pattern consisting of a plurality of color-encoded grid blocks which can be used to uniquely identify the correspondences between the projector plane and the image plane. Seven different colors are used: red, green, blue, white, cyan, magenta and yellow. The final light pattern 30 is shown in FIG. 3.

The intrinsic parameters of the camera and the projector were firstly calibrated using Zhang's method. While in theory two positions are sufficient for this calibration task, in these experiments the pattern was placed at ten different positions and the results of the intrinsic calibration are shown below in Table 2.

TABLE 2

| Parameter | $f_u$ | $f_v$ | $u_0$ | $v_0$ |
|---|---|---|---|---|
| Camera | 1215.3 | 1180.6 | 299.1 | 224.2 |
| Projector | 94.8811 | 89.1594 | 44.3938 | 25.4487 |

When calibrating the extrinsic parameters, four or more point correspondences from a planar surface in the scene were chosen between the projector plane and the camera image, and then a linear system was constructed to compute the homography. The final result for the homography was h=[0.0144, 0.0807, −0.4995, 0.0791, −0.0032, 3.9811, 0.0001, −0.0002].

The method described in this specification was then employed to obtain the rotation matrix and the translation vector and the obtained results were R=[0.0539, 0.9978, −0.0378, 0.8318, −0.0239, 0.5545, 0.5524, −0.0613, −0.8313] and t=[−0.1048, −0.3068, 1.0000] respectively.

After the system was self-recalibrated using an embodiment of the invention, 3D object reconstruction was used to test the self-recalibrated results using a fan model. The fan model 40 is shown in FIG. 4(*a*), while FIG. 4(*b*) shows the superimposed light pattern 42, FIG. 4(*c*) shows polygonized results of reconstructed point clouds 44, and FIG. 4(*d*) shows a CAD model 46 of the reconstructed point clouds.

Figure 5A:
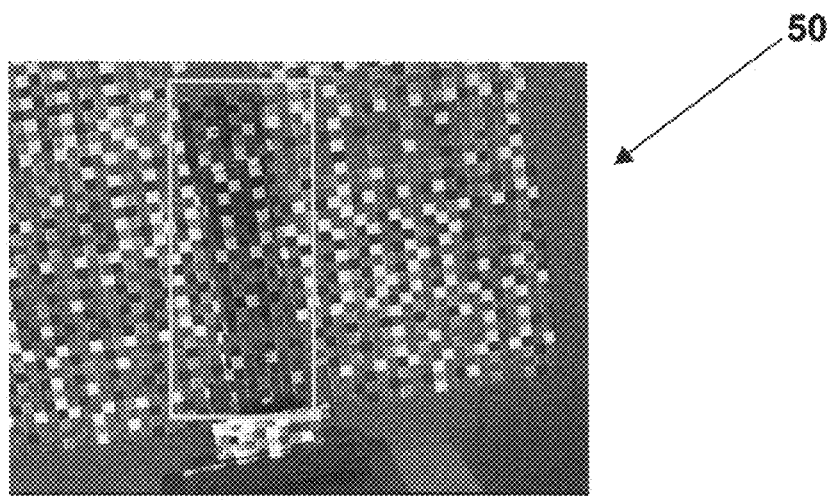
FIGS. 5(a)-(c) show respectively (a) an image of a phone handle with a superimposed light pattern, (b) polygonized results of reconstructed point clouds, and (c) a CAD model of the reconstructed result.
Figure 5B:
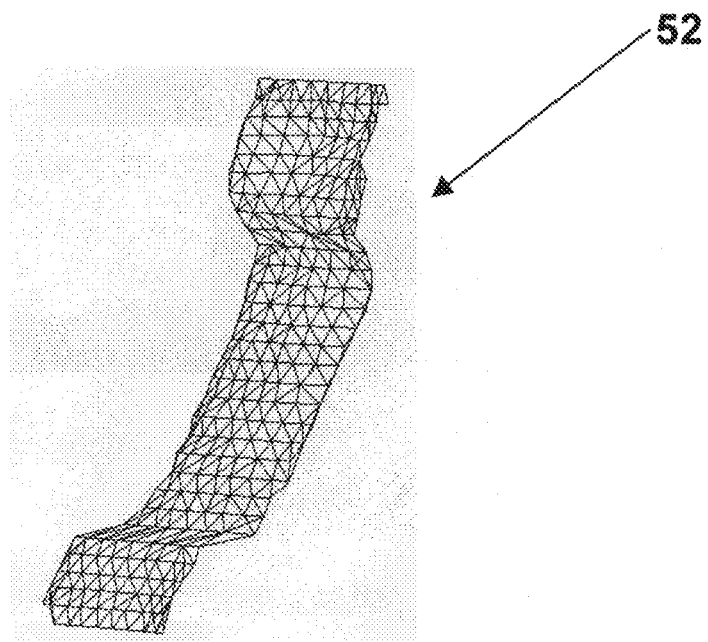
Figure 5C:
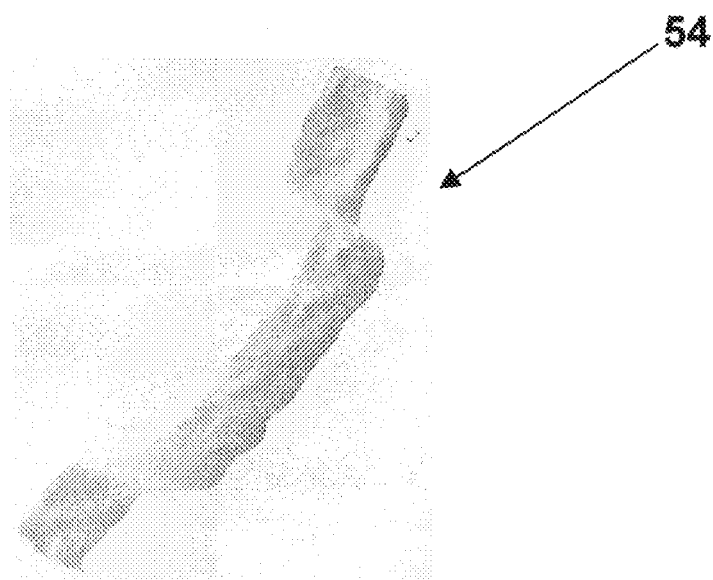

After this test the relative pose was adjusted further and the self-recalibration process was repeated before performing a further test using a phone handle. FIG. 5(*a*) shows the light pattern projected on the image 50, FIG. 5(*b*) shows the polygonized reconstructed point clouds 52 and FIG. 5(*c*) shows a CAD model 54 of the reconstructed results.

It will be noted from the above that the solutions are sensitive to noise. In the following alternative embodiment of the invention different solutions for the translation vector and the rotation matrix are proposed.

As the translation vector is determined up to a nonzero scale factor, for simplicity, we assume that its third component is unity, i.e., $t_3=1$. There are six constraints on the translation vector. By polynomial elimination of the quadratic items, we obtain the following three linear equations:

$$\begin{cases} a_1 t_1 + b_1 t_2 + c_1 = 0 \\ a_2 t_1 + b_2 t_2 + c_2 = 0 \\ a_3 t_1 + b_3 t_2 + c_3 = 0 \end{cases} \quad (26)$$

where $a_1 = w_{13}w_{23} - w_{12}w_{33}$, $b_1 = w_{11}w_{33} - w_{13}^2$, $c_1 = w_{12}w_{13} - w_{11}w_{23}$ $a_2 = w_{22}w_{33} - w_{23}^2$, $b_2 = w_{13}w_{23} - w_{12}w_{33}$, $c_2 = w_{12}w_{23} - w_{13}w_{22}$ $a_3 = w_{22}w_{13} - w_{12}w_{23}$, $b_3 = w_{11}w_{23} - w_{12}w_{13}$, $c_3 = w_{12}^2 - w_{11}w_{22}$.

As can be shown by Proposition 3 in the Annex to this specification, these linear equations are equivalent to each other, and using this proposition the translation vector can be solved as $$\begin{cases} t_1 = \dfrac{w_{13} \pm \sqrt{w_{13}^2 - w_{11}w_{33}}}{w_{33}} \\ t_2 = \dfrac{(w_{13}w_{23} - w_{12}w_{33})t_1 + (w_{12}w_{13} - w_{11}w_{23})}{w_{11}w_{33} - w_{13}^2} \\ t_3 = 1 \end{cases} \quad (27)$$

From (27), there are at most two solutions for the translation vector. In order to determine which one corresponds to the true configuration, the cheirality constraint can again be employed as described above. The use of over-determined constraints in solving the translation vector helps enhance the robustness in practical implementation.

To solve for the rotation matrix, by rearranging, we have $$R^T C - D = 0 \quad (28)$$

where $C=\lambda[t]_x$ and $D=H^T[t]_x$.

Assuming $C=[C_1\ C_2\ C_3]$ and $D=[D_1\ D_2\ D_3]$, we define a 4×4 matrix as $$B = \sum_{i=1}^{3} B_i^T B_i \quad (29)$$

Where $$B_i = \begin{bmatrix} 0 & (C_i - D_i)^T \\ D_i - C_i & [C_i + D_i]_x \end{bmatrix}.$$

Let $q_1 = (q_0\ q_1\ q_2\ q_3)^T$ be the eigenvector of B associated with the smallest eigenvalue. Then the solution for the rotation matrix R is given as $$R = \begin{bmatrix} q_0^2 + q_1^2 - q_2^2 - q_3^2 & 2(q_1 q_2 - q_0 q_3) & 2(q_1 q_3 + q_0 q_2) \\ 2(q_1 q_2 + q_0 q_3) & q_0^2 - q_1^2 + q_2^2 - q_3^2 & 2(q_2 q_3 - q_0 q_1) \\ 2(q_1 q_3 - q_0 q_2) & 2(q_2 q_3 + q_0 q_1) & q_0^2 - q_1^2 - q_2^2 + q_3^2 \end{bmatrix} \quad (30)$$

A number of computer simulations on the proposed algorithms have been implemented in MATLAB. Here, three aspects were considered, i.e., performance on different numbers of point correspondences, performance on different levels of noise and performance on random poses. In each case, the relative errors were evaluated for the translation vector and rotation matrix respectively, defined as $$\frac{\|t - \bar{t}\|}{\|t\|}$$

and $$\|R - \bar{R}\|,$$

where $\bar{t}$ and $\bar{R}$ were the estimated values. It was assumed that a virtual planar target was projected to the projector plane and camera image. The projection points were corrupted by random Gauss noise with various deviations and zero mean, and the average results over 100 trials were reported. In these simulations, the results of this embodiment of the present invention were compared with those of the following three algorithms:

Zhang et al (Z. Zhang, and A. R. Hanson, Scaled Euclidean 3D reconstruction based on externally uncalibrated cameras, *IEEE International Symposium on Computer Vision*, Coral Gables, Fla., November 1995, pp. 37-42, which solves the relative pose problem by decomposition of the planar Homography. In all the graphs, circles (o) and squares (o) are used to indicate the embodiment of the invention and Zhang's results respectively.

Robust pose estimation algorithms with iterative optimization in Schweighofer et al (G. Schweighofer and A. Pinz, "Robust Pose Estimation from a Planar Target," *IEEE Trans. On Pattern Analysis and Machine Intelligence*, Vol. 28, No. 12, Dec. 2006, pp. 2024-2030) and Lu et al, "Fast and globally convergent pose estimation from video images," *IEEE Trans. On Pattern Analysis and*

Machine Intelligence, Vol. 22, No. 6, 200, pp. 610-622. (Here, the algorithms are randomly initialized since they are globally convergent.) They are shown by pentagram ( ) and cross (×).

Figure 6A:
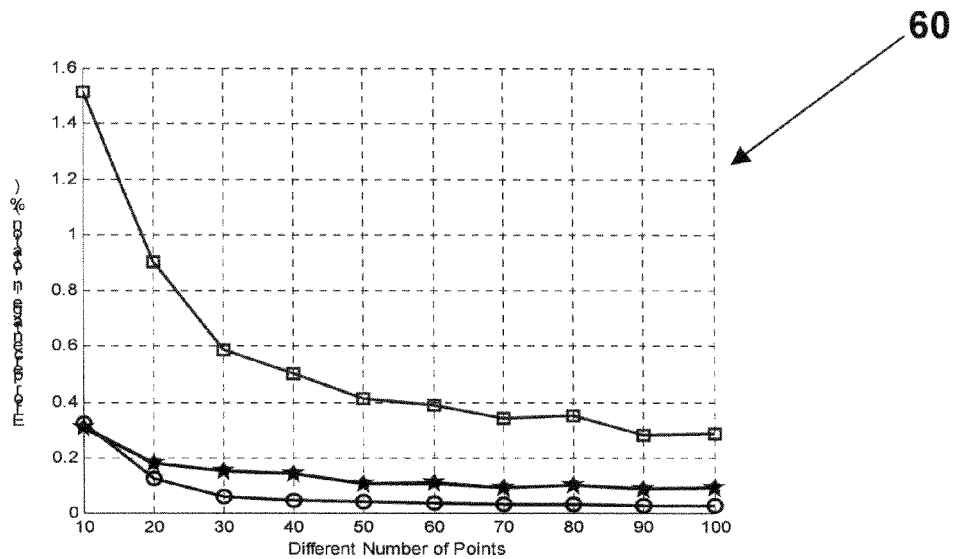
FIGS. 6(a)-(b) are graphs showing the improvement in performance with the use of an increased number of points.
Figure 6B:
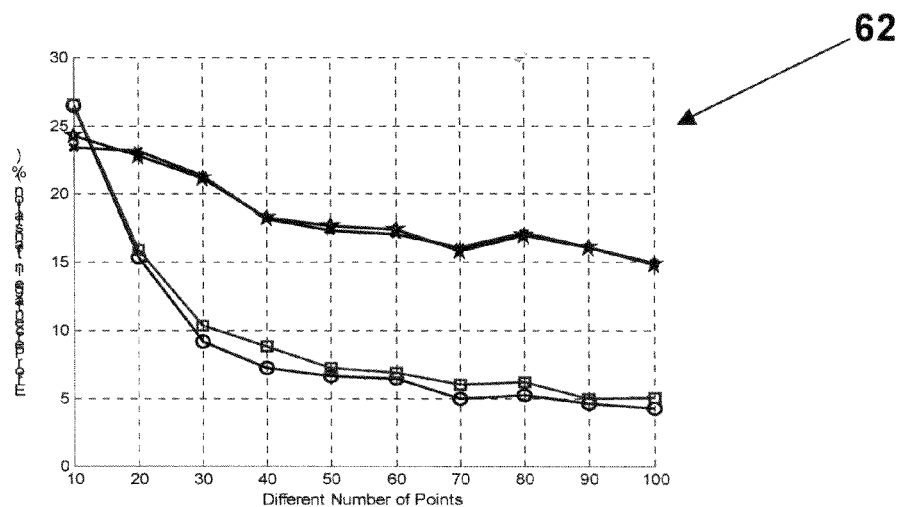

In the first simulation, the dependence of these algorithms on different numbers of point correspondences was studied. Here, the number of points ranged from 10 to 100 and random noise with 0.5 pixel variance was added to the image points. FIGS. 6(a)-(b) show graphs 60, 62, respectively, showing that improved performance was obtained with more points used. However, when the number is larger than 50, the improvement is trivial. In the simulation, the elapsed time was recorded as in Table 3. From this table, we can see that the computational costs increase with the number of points since more computations are required with more points. This is especially the case for iterative algorithms of Schweighofer and Lu. As the embodiment of the invention and Zhang's provide closed-form solutions, they are computationally more efficient than the other two algorithms.

TABLE 3

Comparison of the computational efficiency

| No. of points | Time elapsed in the simulations (s) | | | |
|---|---|---|---|---|
| | Embodiment | Algorithm of [16] | Algorithm of [28] | Algorithm of [21] |
| 10 | 0.0045 | 0.0016 | 0.2686 | 0.2612 |
| 20 | 0.0045 | 0.0020 | 0.2393 | 0.2805 |
| 30 | 0.0041 | 0.0020 | 0.2659 | 0.2961 |
| 40 | 0.0041 | 0.0028 | 0.3352 | 0.3295 |
| 50 | 0.0053 | 0.0031 | 0.3544 | 0.3604 |
| 60 | 0.0058 | 0.0031 | 0.4100 | 0.3926 |
| 70 | 0.0053 | 0.0027 | 0.4352 | 0.4242 |
| 80 | 0.0053 | 0.0025 | 0.4918 | 0.4529 |
| 90 | 0.0044 | 0.0036 | 0.5250 | 0.4774 |
| 100 | 0.0056 | 0.0027 | 0.5623 | 0.5080 |

Figure 7A:
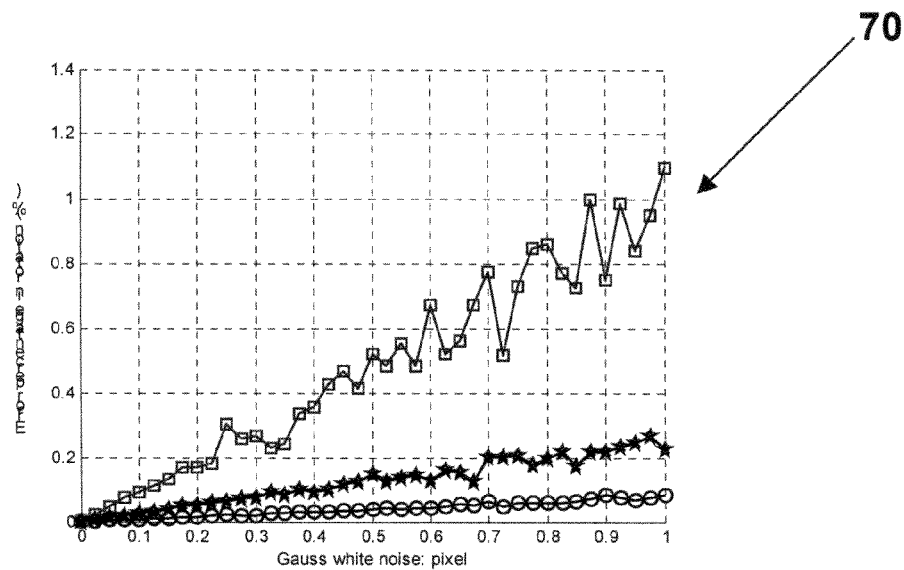
FIGS. 7(a)-(b) are graphs showing the relative errors in one example of the invention compared with three examples of the prior art for comparison in case of different levels of Gauss noise.
Figure 7B:
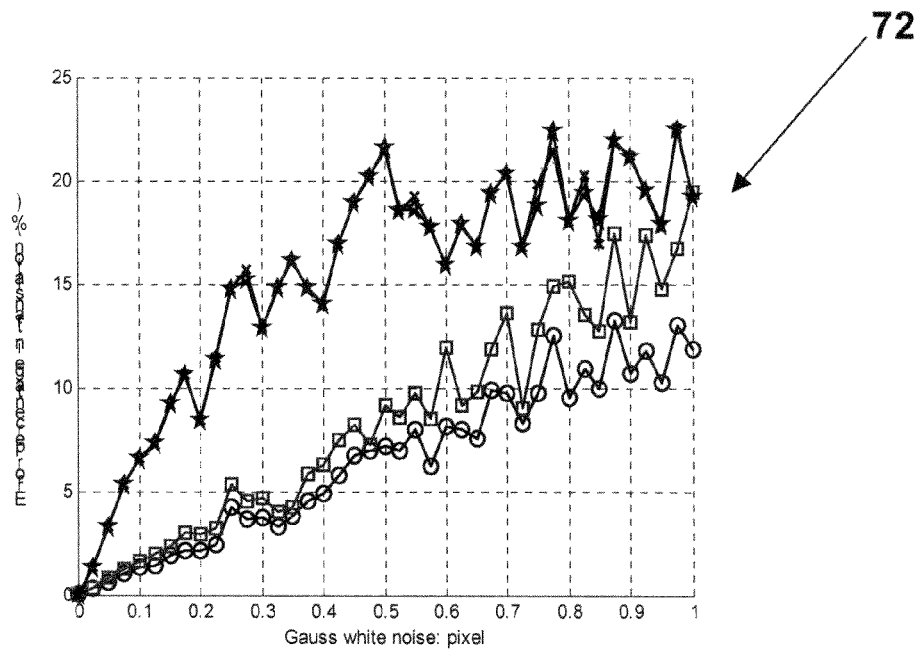

In a further simulation, the level of Gaussian noise was varied from 0 to 1.0 pixel and the relative errors of the four algorithms are shown in graphs 70 and 72 of FIGS. 7(a)-(b), respectively. It is observed that the relative errors increase with increased noise level. The iterative algorithms are more robust in the estimation of rotation matrix than that of translation vector while Zhang's algorithm works the other way around. On the whole, the embodiment of the present invention outperforms the others in the presence of noise.

Figure 8A:
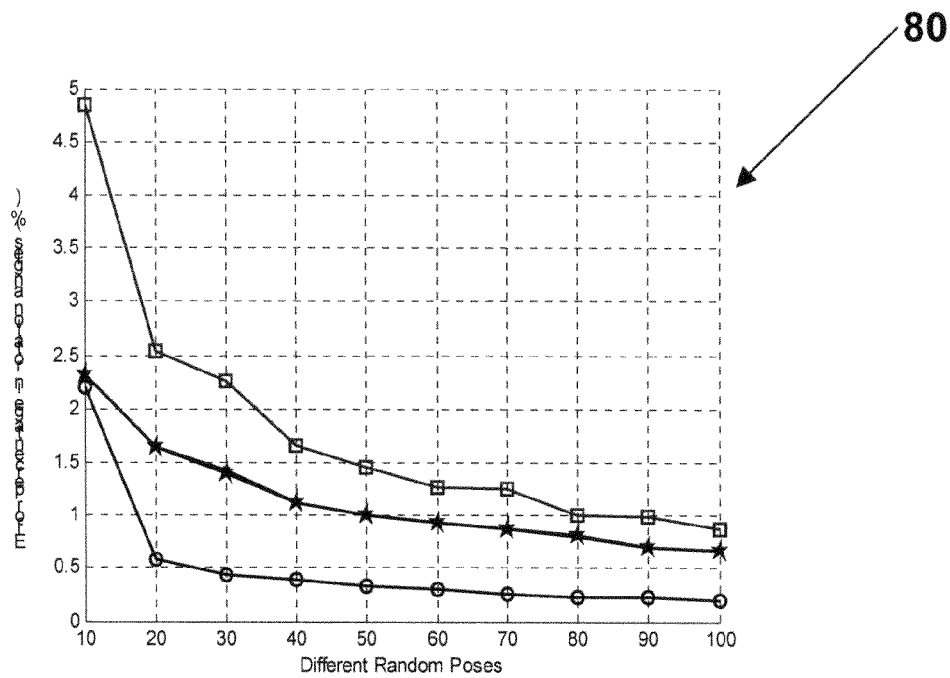
FIGS. 8(a)-(b) are graphs showing the average results in simulations of an example of the invention in cases of ten random poses.
Figure 8B:
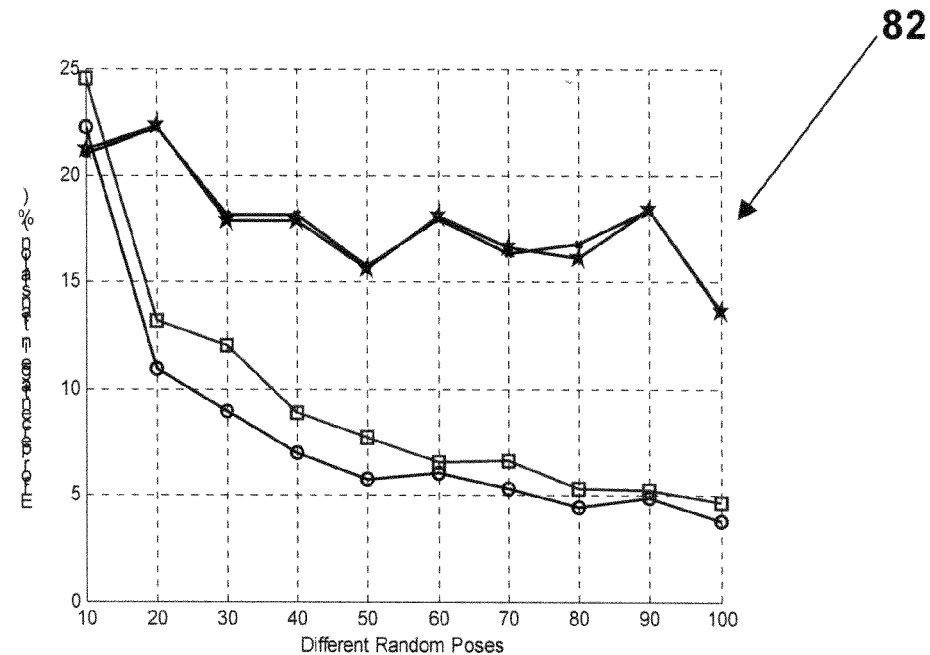

In a further simulation, the performance of these algorithms in ten randomly selected relative poses are illustrated in graphs 80 and 82 of FIGS. 8(a)-(b), respectively. Again, Gaussian noise with 0.5 pixel variance was added to the projection points and 100 trials were run for each pose. It is observed that Zhang's algorithm is very sensitive to the estimation of rotation matrix while the iterative algorithms are sensitive to that of translation vector. The algorithm of embodiments of the invention gives a considerably stable performance for all the poses.

Real data experiments were also performed using the same experimental set-up as described above in respect of the first embodiment. The intrinsic parameters of the camera and the projector were firstly calibrated by a planar pattern using Zhang's method. In the experiments, the pattern was placed at more than two different positions to increase the calibration accuracy. When calibrating the extrinsic parameters, more than four point correspondences from a planar surface in the scene were chosen between the projector plane and the camera image. The computed Homography matrix was h=[−0.4047, 1.0547, −0.3501, 1.2877, 0.0416, 0.0373, 0.2386, −0.1385, 1.0356]. Then using the method of the embodiment of the invention, the results for the three rotation angles and translation vector were given in Table 4.

TABLE 4

Relative Pose of the System

| Rotation Angles | [−2.1691, 2.1397, 0.3903] |
|---|---|
| Translation Vector | [50.1919, −28.8095, 1] |

Figure 9A:
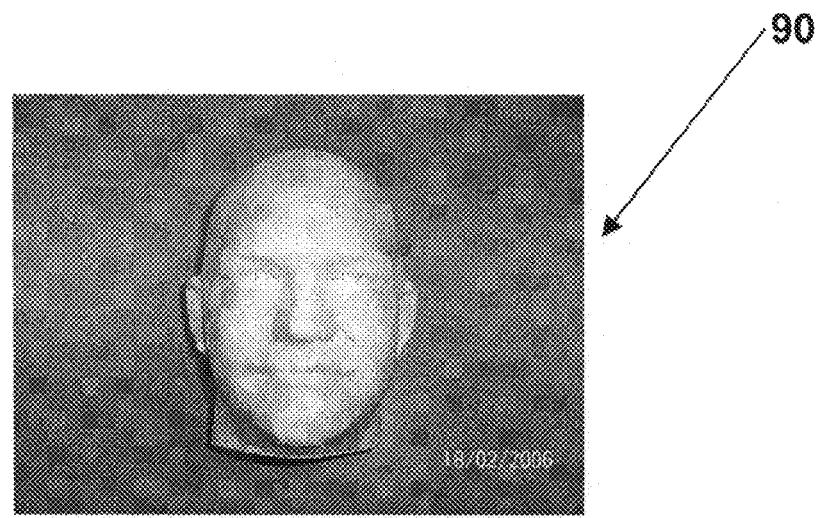
FIGS. 9(a)-(f) show the results obtained in an example of the invention using a man's head.
Figure 9B:
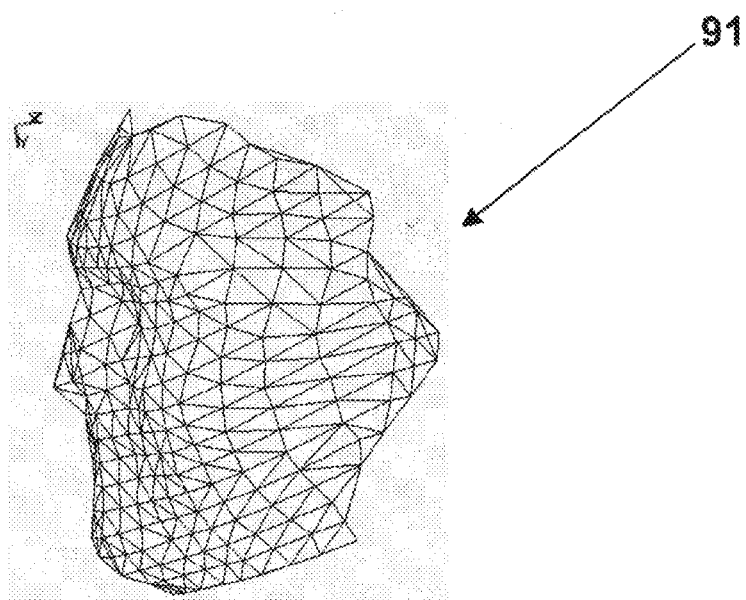
Figure 9C:
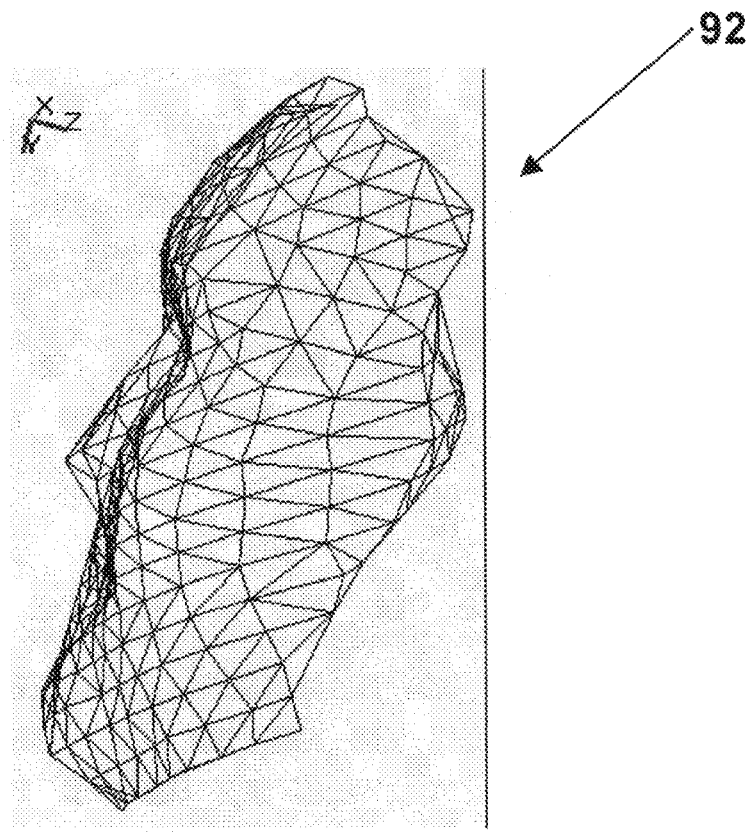
Figure 9D:
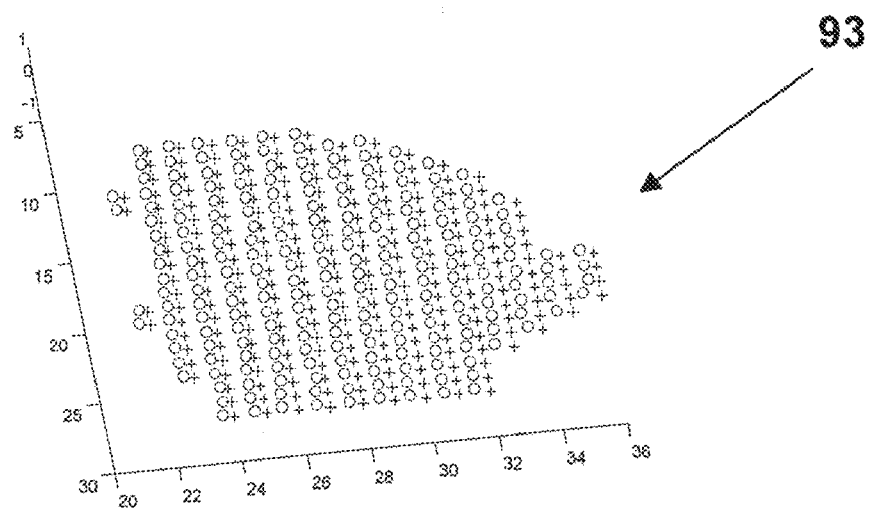
Figure 9E:
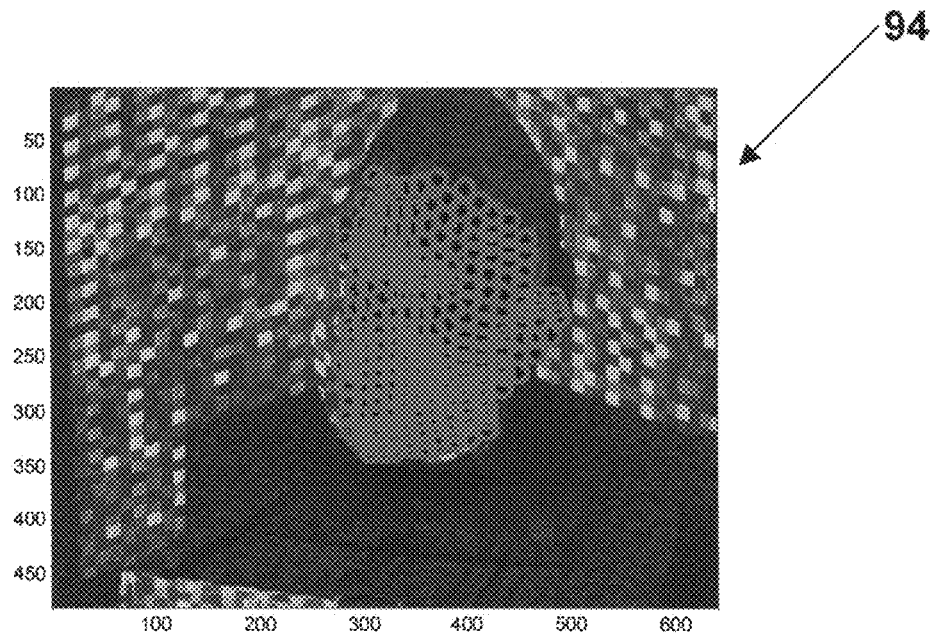
Figure 9F:
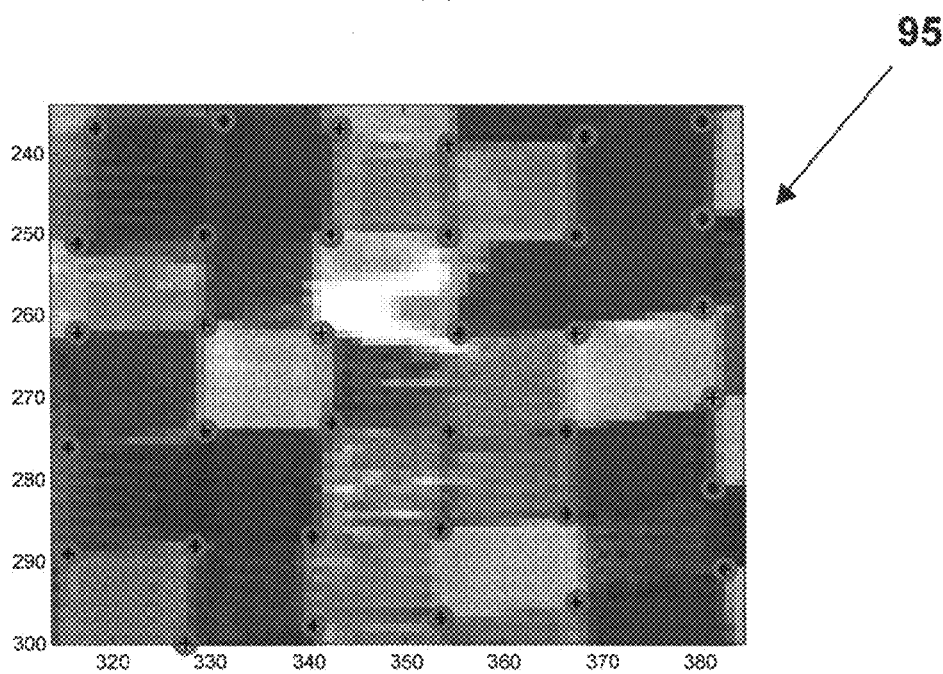

After the system had been calibrated, 3-D object reconstruction was performed to test the calibration results. FIG. 9(a) gives an image 90 of a man's head model. In total, 226 points from the model were reconstructed. Here, the polygonized results 91, 92 of the reconstructed point clouds were shown from two different viewpoints as in FIG. 9(b) and FIG. 9(c), respesctively. Since no ground truth was available, it is not possible to know the real values of the pose parameters of the system and the 3D point clouds. To test the accuracy of the experimental results, the absolute errors between back-projected images of the reconstructed 3D points and the real image features were measured. In general, the more accurate the calibrated pose parameters, the smaller the errors that will result. FIG. 9(d) and FIG. 9(e) show the feature points 93 and back-projected points 94 for the projector plane and the camera image, respectively. FIG. 9(f) gives a zoomed part of the image 95. It is seen that the original feature points and the back-projected points are very close to each other.

Here, we also give a numerical evaluation on the absolute errors in pixel dimensions in Table 5. For comparison, we listed the mean results together with those of the first real data experiment from Fofi et al (D. Fofi, J Salvi, and E. Mouaddib, "Uncalibrated reconstruction: an adaptation to structured light vision," *Pattern Recognition*, Vol. 36, No. 7, July 2003, pp. 1631-1644. In the work by Fofi et al, a different algorithm using the Fundamental matrix is implemented on a vision system with the same structure consisting of a camera and a projector. Considering that only a linear algorithm is involved in the method of the present invention, the results show nontrivial improvement over Fofi's. So this experiment validates the algorithm of the present invention both qualitatively and quantitatively.

TABLE 5

Comparison of the mean absolute errors

| Different Methods | | Camera (pixel) | Projector (pixel) |
|---|---|---|---|
| Fofi's Results | Linear algorithm | 18.428 | 32.751 |
| | Iterative algorithm | 0.204 | 0.169 |
| Our Results | Linear algorithm | 0.0217 | 0.2906 |

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

Annex

Proposition 1:

Let g be any 3×1 nonzero vector and G be a 3×3 nonzero symmetric matrix. If $[g]_x G[g]_x = 0$, then the determinant of G is zero.

Proof

Let $g = [g_1 \ g_2 \ g_3]^T$ and $$G = \begin{bmatrix} G_{11} & G_{12} & G_{13} \\ G_{12} & G_{22} & G_{23} \\ G_{13} & G_{23} & G_{33} \end{bmatrix}$$

Since g is nonzero, without loss of generality, we let $g_1 \neq 0$ to prove this proposition. Expanding $[g]_x G[g]_x = 0$, we have $$\begin{cases} g_1^2 G_{22} + g_2^2 G_{11} - 2g_1 g_2 G_{12} = 0 \\ g_1^2 G_{33} + g_3^2 G_{11} - 2g_1 g_3 G_{13} = 0 \\ g_1^2 G_{23} + g_2 g_3 G_{11} - g_1 g_2 G_{13} - g_1 g_3 G_{12} = 0 \end{cases}$$

from which $G_{22}$, $G_{33}$, $G_{23}$ are given as:

$$\begin{cases} G_{22} = -g_2^2 G_{11} + 2g_1 g_2 G_{12}/g_1^2 \\ G_{33} = -g_3^2 G_{11} + 2g_1 g_3 G_{13}/g_1^2 \\ G_{23} = -g_2 g_3 G_{11} + g_1 g_2 G_{13} + g_1 g_3 G_{12}/g_1^2 \end{cases} \quad (A1)$$

Then we substitute (A1) into the expression of the determinant of G. We obtain det(G)=0.

The proposition can be proved similarly if $g_2 \neq 0$ or $g_3 \neq 0$.
[End of Prove]
Proposition 2:

Let f and g be any two 3×1 non-zero vectors. The three eigenvalues of the matrix $I + fg^T + gf^T$ satisfy either (a) or (b):
 (a) The three eigenvalues are distinct from each other, and the middle one is 1.
 (b) Two of the eigenvalues are both 1 while the third is not 1.

Proof

Denote $I + fg^T + gf^T$ as Q, and let $f = [f_1 \ f_2 \ f_3]^T$, $g = [g_1 \ g_2 \ g_3]^T$
From the definition of characteristic function of Q, we have $$det(I + fg^T + gf^T - \delta I) = 0 \quad (A2)$$

Expanding (A2) gives $$(1-\delta)((1-\delta)^2 + p(1-\delta) + q) = 0 \quad (A3)$$

where $p = -2(f_1 g_1 + f_2 g_2 + f_3 g_3)$ and $$q = -(f_1 g_2 - f_2 g_1)^2 - (f_1 g_3 - f_3 g_1)^2 - (f_2 g_3 - f_3 g_2)^2.$$

Therefore, one of the eigenvalues of Q is 1. The other two are the roots of $(1-\delta)^2 + p(1-\delta) + q = 0$. Letting $\gamma = 1 - \delta$ changes this equation into $$\gamma^2 + p\gamma + q = 0 \quad (A4)$$

According to the expressions of p, we know that p=0 means that f is orthogonal to g.

From q=0, we have $f_1/g_1 = f_2/g_2 = f_3/g_3$, which indicates that vector f is parallel with g.

Therefore, p and q cannot be zero simultaneously and $q \leq 0$. So there are in total the following two cases:
 (a) If $q \neq 0$, then $q < 0$. Thus, the two solutions of $\gamma$ have different signs by (A4). It follows that one of $\delta$ is larger than 1 and the other is smaller than 1.

(b) If q=0, then $p \neq 0$. By (10), we obtain $\gamma = 0$, $\gamma = -p \neq 0$, from which we get $\delta = 1, \delta = 1+p \neq 1$.
[End of Prove]
Proposition 3:

The three linear equations in (26) are equivalent to each other.

From (3), we have $$HH^T = \lambda^2 I + \lambda^2(Rnt^T + tn^T R^T + n^T n tt^T) \quad (A5)$$
$$= \lambda^2 I + \lambda^2(st^T + ts^T)$$

where $s = Rn + \dfrac{n^T n}{2}t$.

Considering the definition of W in (19), we obtain $W = \lambda^2(st^T + ts^T)$

In our system, we assume that the scene plane is opaque. Thus the camera and the projector should lie on the same side of the plane and locate at different positions in practice. Therefore, the two vectors t and s in (A5) are nonzero and different from each other. Consequently, the rank of W is 2 and the determinant of W is zero, i.e., $$det(W) = 2w_{12}w_{13}w_{23} - w_{23}^2 w_{11} - w_{12}^2 w_{33} - w_{13}^2 w_{22} + w_{11}w_{22}w_{33} = 0. \quad (A6)$$

From the first two equations in (26), we have $$a_1 b_2 - a_2 b_1 = w_{33} det(W) = 0.$$

$$c_1 b_2 - c_2 b_1 = w_{13} det(W) = 0.$$

Therefore, they are equivalent to each other.

Similarly, the first and the third equations in (26) can be proved to be equivalent to each other In summary, the three linear equations are equivalent to each other.
[End of Prove]

The invention claimed is:

1. A method for self-recalibration of a structured light vision system comprising a camera and a projector, the method comprising:
 defining a camera plane and a projector plane;
 computing a Homography matrix between the camera plane and the projector plane;
 determining a translation vector and a rotation matrix from Homography-based constraints;
 wherein prior to determining the translation vector, if intrinsic parameters of the camera are known, a scale factor and its sign are determined; and
 wherein the scale factor $\lambda$ is determined from an equation: $\lambda^2 [t]_x \overline{H}\overline{H}^T [t]_x = [t]_x [t]_x$ wherein $[t]_x$ comprises a skew matrix of the translation vector t, and wherein $\overline{H}$ comprises calibrated Homography.

2. A method as claimed in claim 1, wherein prior to determining the translation vector, if a focal length of the camera is varying, the focal lengths are first computed and then the scale factor is determined.

3. A method as claimed in claim 1, wherein computing the Homography matrix comprises computing the Homography matrix from at least four pairs of corresponding projection points of the scene where each of the at least four pairs comprises a point in the projector plane and its corresponding point in the camera plane.

4. A method as claimed in claim 1, wherein bundle adjustment is used to improve the solutions.

5. A computer vision system, comprising: a projector for projecting a light pattern onto an object in a scene, a camera for obtaining an image of said object, and a computer for controlling the vision system, wherein said computer implements a self-recalibration method comprising:

defining a camera plane and a projector plane;

computing a Homography matrix between the camera plane and the projector plane;

determining a translation vector and a rotation matrix from Homography-based constraints;

wherein prior to determining the translation vector, if intrinsic parameters of the camera are known, a scale factor and its sign are determined; and wherein the scale factor $\lambda$ is determined from an equation: $\lambda^2 [t]_x \overline{H} \overline{H}^T [t]_x = [t]_x [t]_x$ wherein $[t]_x$ comprises a skew matrix of the translation vector t, and wherein $\overline{H}$ comprises calibrated Homography.

6. A computer vision system as claimed in claim 5, wherein prior to determining the translation vector, if a focal length of the camera is varying, the focal lengths are first computed and then the scale factor is determined.

7. A computer vision system as claimed in claim 5, wherein computing the Homography matrix comprises computing the Homography matrix from at least four pairs of corresponding projection points of the scene where each of the at least four pairs comprises a point in the projector plane and its corresponding point in the camera plane.

8. A computer vision system as claimed in claim 5, wherein in said self-recalibration method bundle adjustment is used to improve the solutions.

\* \* \* \* \*